United States Patent [19]
Labonde et al.

[11] Patent Number: 6,076,883
[45] Date of Patent: Jun. 20, 2000

[54] ELECTRICAL-CABLE SYSTEM FOR MOTOR-VEHICLE SLIDING DOOR

[75] Inventors: Damien Labonde, Essen; Johannes-Theodor Menke, Velbert, both of Germany

[73] Assignee: Kiekert AG, Heiligenhaus, Germany

[21] Appl. No.: 09/047,836

[22] Filed: Mar. 25, 1998

[30] Foreign Application Priority Data

Apr. 25, 1997 [DE] Germany ............................ 197 17 490

[51] Int. Cl.[7] ................................................... B60J 5/06
[52] U.S. Cl. ................................ 296/155; 49/358; 49/360
[58] Field of Search ................................ 296/155, 152; 49/358, 360, 312

[56] References Cited

U.S. PATENT DOCUMENTS

| | | | |
|---|---|---|---|
| 5,367,827 | 11/1994 | Tajima et al. | 49/352 |
| 5,536,061 | 7/1996 | Moore et al. | 296/155 |
| 5,857,635 | 1/1999 | Klippert | 49/352 |

Primary Examiner—D. Glenn Dayoan
Assistant Examiner—Lori L. Coletta
Attorney, Agent, or Firm—Herbert Dubno; Andrew Wilford

[57] ABSTRACT

A motor vehicle has a body, electrical devices including a controller and a power supply mounted in the body, a door slidable on the body between a closed position and an open position, and electrical devices mounted in the door. The devices in the body and in the door are interconnected by an electrical-cable connecting system that has a nonrotatable pivot pin fixed on the body adjacent the door, a drum rotatable about the pin, and a flexible multiconductor electrical cable wound in the closed position of the door about the drum and having an inner end fixed to the pin and connected to the devices mounted in the body and an outer end fixed to the door and connected to the devices mounted in the door. A winder connected between the body and the drum rotatably biases the drum to rotate in a direction winding the cable onto the drum and urging the door into the closed position.

5 Claims, 3 Drawing Sheets

ELECTRICAL-CABLE SYSTEM FOR MOTOR-VEHICLE SLIDING DOOR

FIELD OF THE INVENTION

The present invention relates to a motor-vehicle with a sliding door. More particularly this invention concerns an electrical-cable system for connecting electrical devices in such a door to other electrical devices in the motor-vehicle body.

BACKGROUND OF THE INVENTION

A door of a standard modern-day motor vehicle such as described in copending U.S. patent application Ser. No.08/831,974 now U.S. Pat. No. 5,876,087 or Ser. No.08/831,981 now U.S. Pat. No. 5,836,639 can be equipped with electrically operated or assisted door latches, with electrically powered window operators, and with various sensors and switches for reporting the open or closed position of the door and/or of its window. In the most up-to-date systems all information is transmitted or exchanged via a single data line while the actual power for the various actuators must be supplied through the standard current-carrying positive and negative conductors. Thus at least three conductors must extend between the current source and control circuits mounted in the vehicle body and the various devices—actuators, sensors, and switches—in the actual door.

With a standard pivotal door the multiconductor electrical cable making the necessary connection is simply loosely passed between the vehicle body and the door and flexes somewhat each time the door is opened and closed. Such a system can be counted on to have a very long service life if engineered properly.

With a sliding door, however, a substantially greater problem is present since the door travels often a distance of as much as 1 m between the open and closed positions. As a result it is impossible to simply provide a loop of cable to make the connection, since it would get caught in the slider mechanism or otherwise interfere with operation of the door. Solutions have been proposed to tension the cable and allow it to pull out and retract, but have generally failed. Alternately it is known to provide a plug and socket that fit together in the closed position of the door only, but such a system requires extremely good engineering and leaves the door completely unconnected when it is open.

OBJECTS OF THE INVENTION

It is therefore an object of the present invention to provide an improved cable system for a motor-vehicle sliding door.

Another object is the provision of such an improved cable system for a motor-vehicle sliding door which overcomes the above-given disadvantages, that is which ensures continuous connection between the electrical devices mounted on the motor vehicle body and those in the door, and that has a long service life and simple construction.

SUMMARY OF THE INVENTION

A motor vehicle has a body, electrical devices including a controller and a power supply mounted in the body, a door slidable on the body between a closed position and an open position, and electrical devices mounted in the door. The devices in the body and in the door are interconnected by an electrical-cable connecting system that has according to the invention a nonrotatable pivot pin fixed on the body adjacent the door, a drum rotatable about the pin, and a flexible multiconductor electrical cable wound in the closed position of the door about the drum and having an inner end fixed to the pin and connected to the devices mounted in the body and an outer end fixed to the door and connected to the devices mounted in the door. A winder connected between the body and the drum rotatably biases the drum to rotate in a direction winding the cable onto the drum and urging the door into the closed position.

With this system, therefore, the cable remains permanently connected at each end so that the devices in the door and the devices in the vehicle body are connected at all times. The cable is payed out and reeled back in as the door is opened and closed so that it is maintained taut by the winder and will therefore keep out of harm's way. Furthermore the action of winding up on and paying it off from the winder drum is a fairly gentle action that will not wear out this cable.

The cable according to the invention is a flat cable having at least three conductors and the biasing unit can be a spiral spring. In accordance with the invention the motorvehicle body has a roof above the door and a door post engageable with the door in the closed position thereof. The pin and drum are mounted on the body where the post meets the roof.

The drum according to the invention is cylindrical and hollow and is formed with a radially throughgoing aperture. The cable passes through the aperture and is fixed to the drum at the aperture. The cable has a plurality of turns inside the drum around the pin so that the turns are wound tightly around the pin when the door is in the open position and loosely when the door is in the open position.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
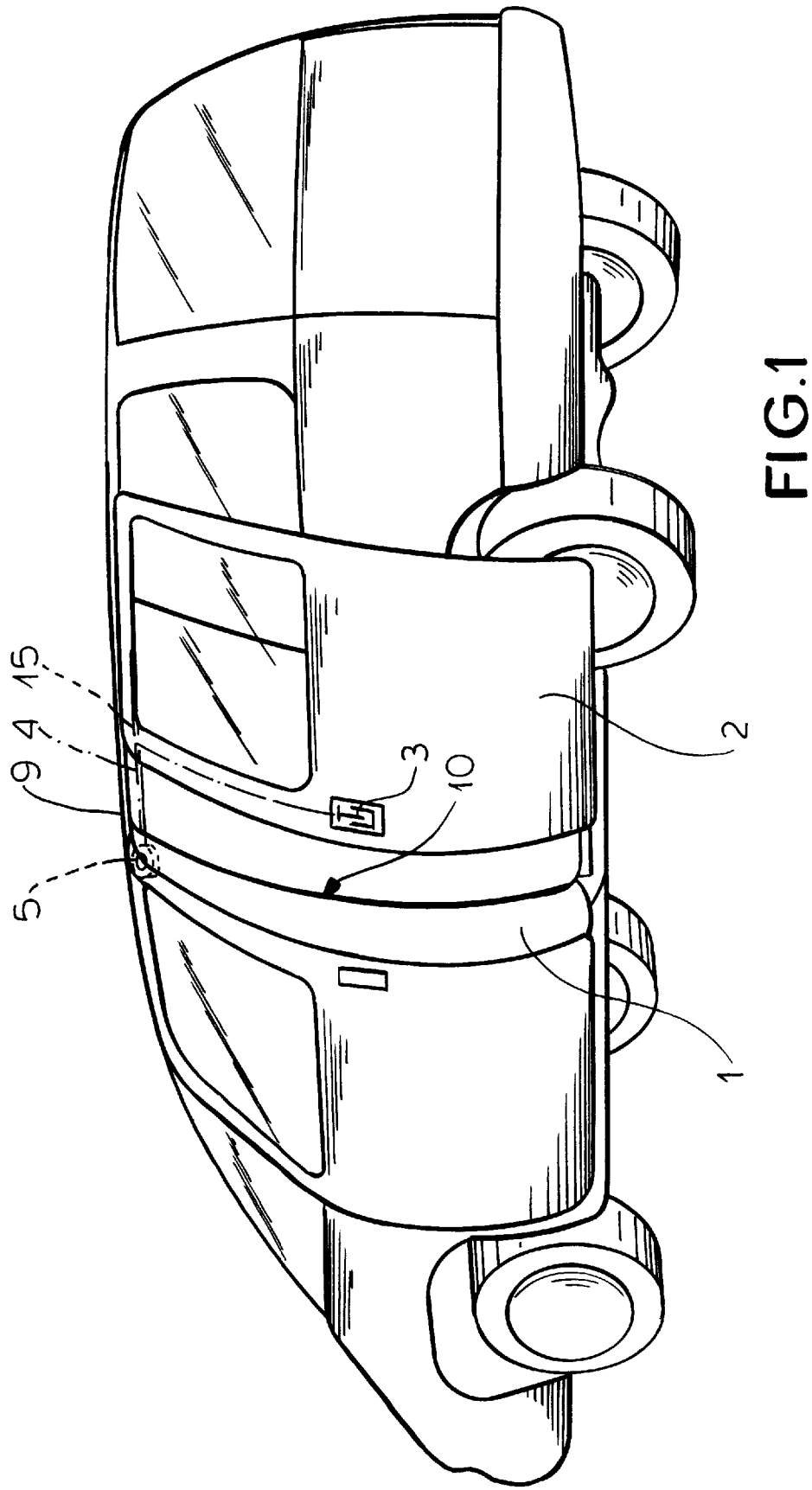
FIG. 1 is a perspective and partly schematic view of a motor vehicle equipped with a sliding door according to the invention.
Figure 2:
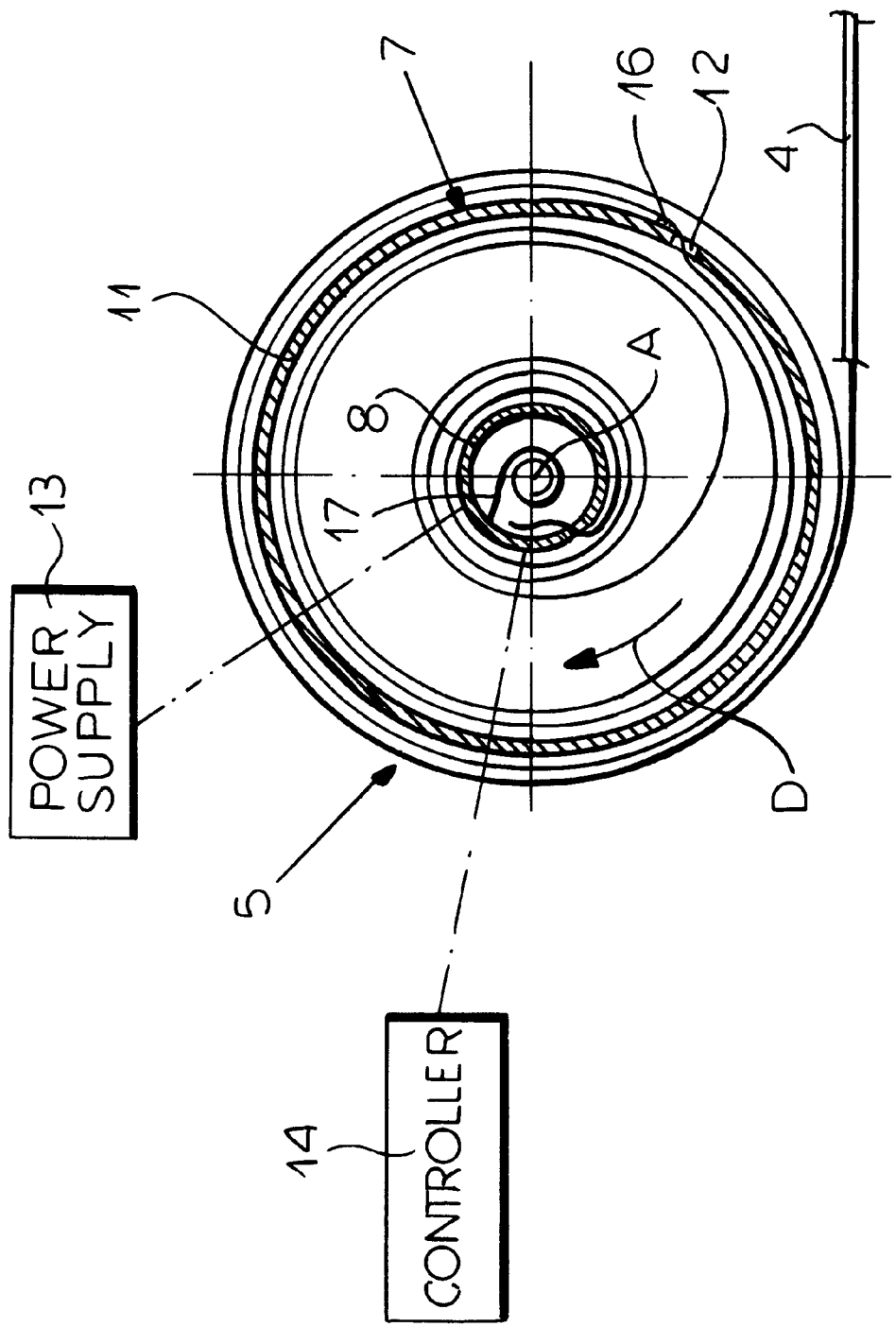
FIG. 2 is a partly diagrammatic side sectional view of the cable system of this invention.
Figure 3:
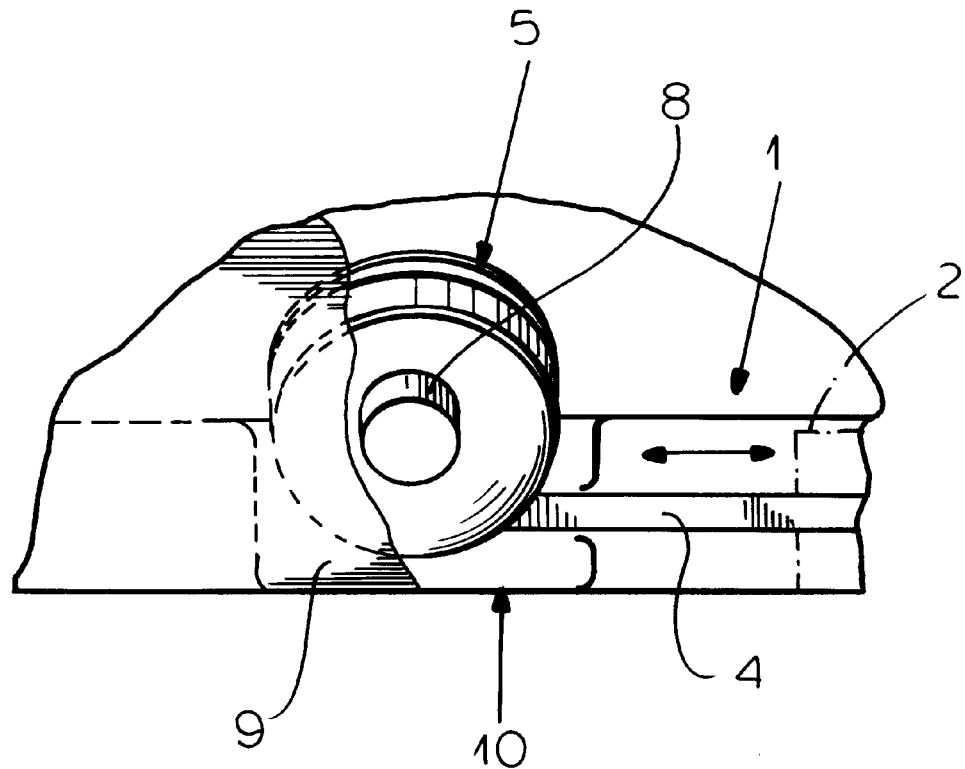
FIG. 3 is a partly broken-away perspective view of the cable system.
Figure 4:
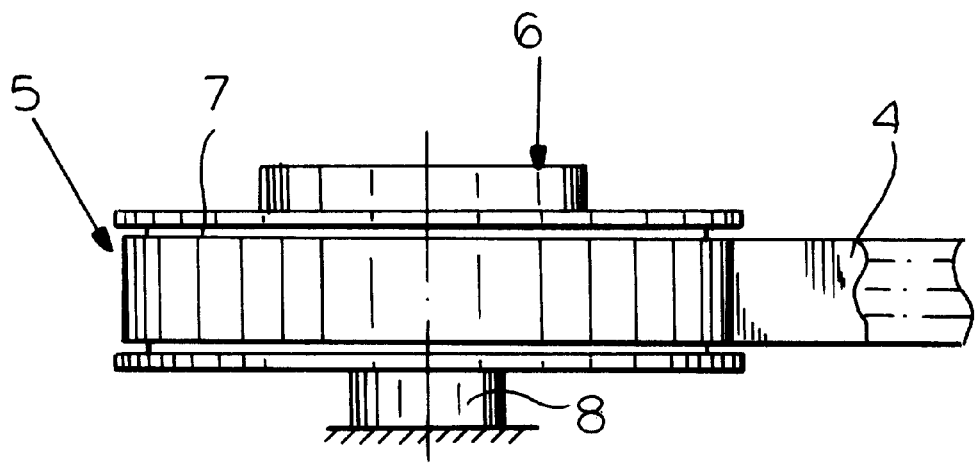
FIG. 4 is a top view of the cable system.

As seen in FIG. 1 a motor vehicle has a body 1 having a roof 9 and a door post 10 and provided with a sliding door 2, here shown in the open position. The body 1 carries a battery or power supply 13 and electrical devices such as a controller 14 shown schematically in FIG. 2. The door 2 has an electrically operable latch 3 and may contain other electrical devices such as a power-window opener and sensor switches for reporting the positions of the door and its window.

According to the invention a flat three-conductor electrical cable 4 extends between a winder 5 mounted where the door post 10 meets the roof 9 and an anchor location 15 on the door 2. This winder 5 comprises a hollow cylindrical drum 7 rotatable about an axis A defined by a pin 8 fixed on the vehicle body 1. A tensioning unit 6 comprising a spiral spring shown schematically at 17 serves to continuously bias the drum 7 rotationally in the direction D to wind up the cable 4 on an outer face 11 of the drum 7.

The drum 7 is formed with a radially throughgoing aperture, here an axially extending slot 12, through which the cable 4 passes and where it is fixed at an anchor point 16. Inside the drum 7 there are several turns of the cable 4 whose inner end is fixed to the pin 8 where it is connected to the power supply 13 and controller 14. When the door 2 is in the illustrated open position the cable 4 inside the drum 7 is wound fairly tightly about the pin 8, but when the door 2 is closed, it is wound somewhat more loosely about the pin 8.

Thus with this system the cable 4 is maintained fairly taut under all circumstances, accommodated in the upper slide for the door 2. It flexes only moderately when being payed out or wound back in so that its service life can be long, and the mechanism for paying it out and winding it back is fairly simple. Most of the flexing takes place inside the drum 7, which can be sealed tight, so that little damage or wear can be expected here.

We claim:

1. In a motor vehicle having:

a body;

electrical devices including a controller and a power supply mounted in the body;

a door slidable on the body between a closed position and an open position; and electrical devices mounted in the door, an electrical-cable connecting system comprising:

a nonrotatable pivot pin fixed on the body adjacent the door;

a drum rotatable about the pin;

a flexible multiconductor electrical cable wound in the closed position of the door about the drum and having an inner end fixed to the pin and connected to the devices mounted in the body and an outer end fixed to the door and connected to the devices mounted in the door; and means connected between the body and the drum for rotatably biasing the drum to rotate in a direction winding the cable onto the drum and urging the door into the closed position.

2. The electrical-cable connecting system for a motor-vehicle sliding door as defined in claim 1 wherein the cable is a flat cable having at least three conductors.

3. The electrical-cable connecting system for a motor-vehicle sliding door as defined in claim 1 wherein the means is a spiral spring.

4. The electrical-cable connecting system for a motor-vehicle sliding door as defined in claim 1 wherein the body has a roof above the door and a door post engageable with the door in the closed position thereof, the pin and drum being mounted on the body where the post meets the roof.

5. The electrical-cable connecting system for a motor-vehicle sliding door as defined in claim 1 wherein the drum is cylindrical and hollow and is formed with a radially throughgoing aperture, the cable passing through the aperture and being fixed to the drum at the aperture, the cable having a plurality of turns inside the drum around the pin, whereby the turns are wound tightly around the pin when the door is in the open position and loosely when the door is in the open position.

* * * * *